O. M. POLLOCK.
TILTABLE HEADLIGHT.
APPLICATION FILED JAN. 24, 1920.
1,363,483.
Patented Dec. 28, 1920.
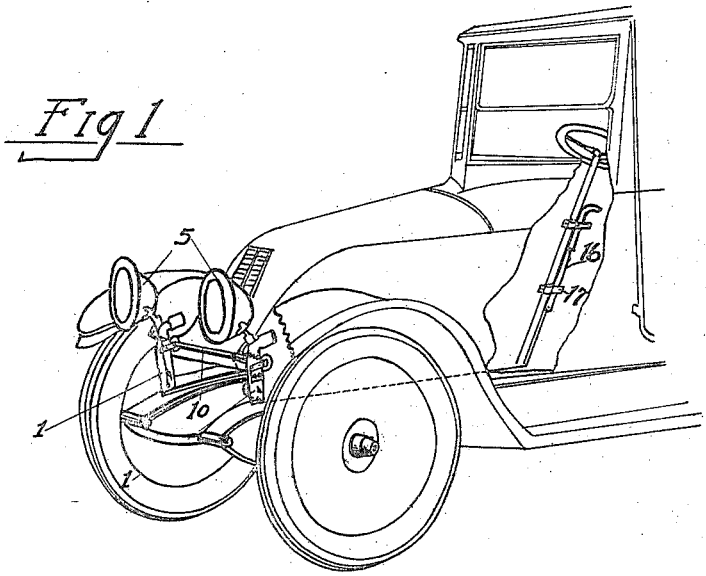
Fig 1
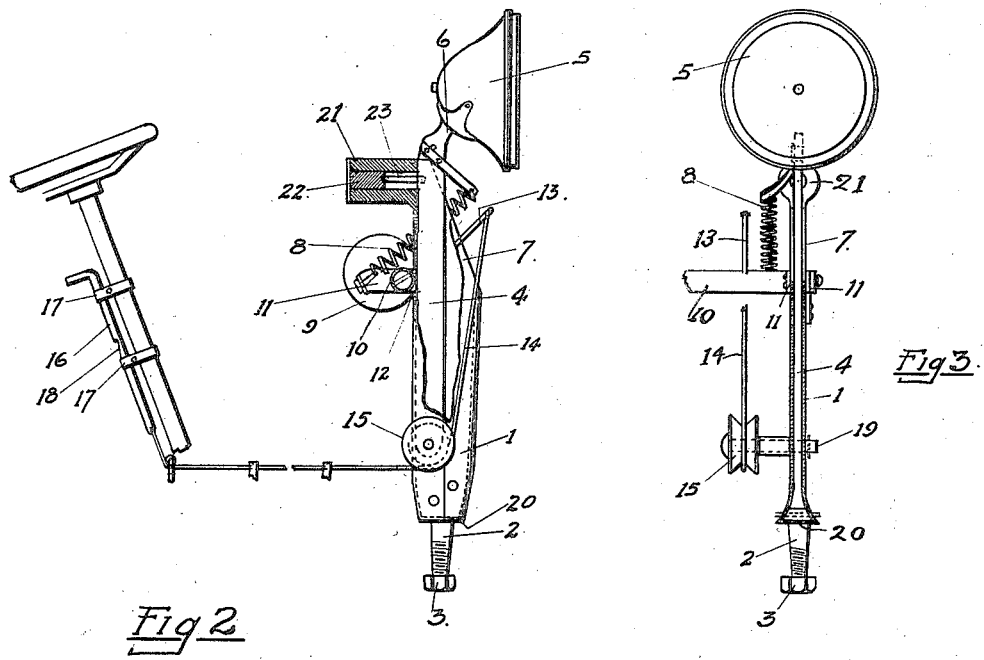
Fig 2
Fig 3
INVENTOR.
O. M. POLLOCK.
BY Edward Reed
ATTORNEY ced by me of
UNITED STATES PATENT OFFICE.

OLIVER M. POLLOCK, OF SPRINGFIELD, OHIO.

TILTABLE HEADLIGHT.

1,363,483.  Specification of Letters Patent.  Patented Dec. 28, 1920.

Application filed January 24, 1920. Serial No. 353,707.

*To all whom it may concern:*

Be it known that I, OLIVER M. POLLOCK, a citizen of the United States, residing at Springfield, in the county of Clark and State of Ohio, have invented certain new and useful Improvements in Tiltable Headlights, of which the following is a specification, reference being had therein to the accompanying drawing.

This invention relates to tiltable head lights for automobiles and the like.

It has been proposed heretofore to tilt the head lights of an automobile to cause the light to be directed onto the road immediately in front of the automobile and to thus remove the glare of the same from the eyes of persons approaching the machine without depriving the driver of the light on the roadway. The object of the present invention is to provide a tiltable head light having a very strong, rigid supporting structure which will hold the head light firmly in position and which will permit the same to be easily tilted.

A further object of the invention is to provide a tiltable head light which will be returned to its normal position by means of a spring without jar or shock such as would tend to injure the filament of the lamp.

Other objects of the invention will appear as the device is described in detail. In the accompanying drawings Figure 1 is a perspective view of the forward portion of an automobile showing the invention applied thereto; Fig. 2 is a side elevation, partly in section, of one of the lamps and its supporting structure together with the actuating device therefor; and Fig. 3 is a sectional view taken vertically through the forward portion of the housing.

In these drawings I have illustrated one embodiment of my invention and having shown the same as comprising an elongated housing 1, open at its upper end and provided at its lower end with means for attaching the same to a supporting structure, such as a tapered pin 2 adapted to extend through a supporting bracket and having its lower end threaded to receive a nut 3. Pivotally mounted in the housing near the lower end thereof is an arm 4 which projects beyond the open end thereof and supports the head light 5. The head light may be secured to the arm in any suitable manner but I prefer to cast the attaching bracket 6 integral with the arm 4. The housing fits snugly against the sides of the arm 4 to hold the same against lateral vibration and is of sufficient width to permit of the necessary pivotal movement of the arm to tilt the head light. To avoid the necessity of making the housing of undue width I prefer that the upper edge thereof should be inclined upwardly and rearwardly, as shown at 7, and inasmuch as the upper edge of the front wall of the housing constitutes a stop which limits the forward movement of the arm it will be apparent that the arm will have a relatively large movement.

The supporting arm 4 may be actuated in any suitable manner and in the present instance it is retained normally in its upright, or retracted, position by means of a spring 8. A cam, or eccentric disk, 9 is mounted on a shaft 10 journaled in brackets 11 secured to the side walls of the housing and projects through a slot 12 in the rear wall of the housing to engage and actuate the arm. The shaft has secured thereto a rock arm 13 to which is connected a cable 14 which extends downwardly about a guide pulley 15 thence rearwardly to a point near the driver's seat where it is connected with a suitable actuating device. In the present construction the actuating device is in the form of a rod 16 slidably mounted in suitable guides, 17, secured to the steering column and is provided with a notch 18 adapted to engage the upper guide 17 to retain the head light in its tilted position. The guide pulley 15 may be mounted in any suitable manner, but I prefer to mount the same upon an extension of the pin 19 upon which the arm 4 is mounted. The two head lights of the automobile are independently mounted and are connected one to the other only by means of the shaft 10 which operates the cams for the two head lights. In the present construction I have provided a single operating cable, but obviously, if it should be desired, a double cable could be used so that power could be applied to the shaft at both ends thereof. I have here shown the housing as provided at its lower end with an opening 20 to permit the escape of dust or dirt which may enter the open upper end thereof.

To absorb the shock due to the return of the arm by the spring 8 and thus prevent injury to the lamp filament, or other parts of the mechanism, I have provided a cushioning device which is preferably in the form of a dash pot 21 having mounted therein a plunger 22 which is connected with the arm 4. The dash pot may be mounted in any suitable manner but as here shown it is cast integral with the rear half of the housing, and the plunger 22 is connected with the rod by means of a link, or connecting rod, 23, which is pivotally connected at its respective ends to the plunger and the arm 4.

It will be apparent that when the head lights are in their normal positions a pull on the operating rod 16 will rotate the shaft 10 about its axis and cause the cams to engage the arms of the two head lights, thus rocking these arms about their axes and tilting the head lights. As soon as the actuating rod is released the springs 8 will return the arms 4, and the head lights, to their normal positions, this movement being retarded by the cushioning device which absorbs the shock incident to this movement. The device is of a very strong, rigid construction which will stand up well under the vibration due to the travel of the machine, and the device is very easily operated and requires but a minimum of attention on the part of the driver.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a device of the character described, a supporting member adapted to be attached to a vehicle, an arm pivotally mounted on said supporting member, a head light secured to said arm at a point remote from its axis, a shaft mounted on said supporting member, and a cam mounted on said shaft and acting on said arm to rock the same about its axis and tilt said head light.

2. In a device of the character described, a supporting member adapted to be attached to a vehicle, an arm pivotally mounted on said supporting member, a head light secured to said arm at a point remote from its axis, a shaft mounted on said supporting member, a cam mounted on said shaft and acting on said arm to rock the same about its axis and tilt said head light, and a spring acting on said arm to retain the same in its normal position.

3. In a device of the character described, an elongated housing open at its upper end, an arm pivotally mounted near the lower end of said housing, fitting closely between the side walls thereof and projecting through the open upper end thereof, a head light secured to said arm, and means for actuating said arm to move the same about its axis.

4. In a device of the character described, an elongated housing open at its upper end, an arm pivotally mounted in said housing near the lower end thereof and fitting closely between the side walls thereof, said housing being of a width greater than the width of said arm, a head light secured to the upper end of said arm above said housing, and means for moving said arm about its axis.

5. In a device of the character described, an elongated housing open at its upper end, an arm pivotally mounted in its housing near the lower end thereof and fitting closely between the side walls thereof, said housing being of a greater width than the width of said arm, a head light secured to the upper end of said arm above said housing, a cam arranged to engage said arm to impart pivotal movement thereto within said housing, and means for actuating said cam.

6. In a device of the character described, an elongated housing open at its upper end, an arm pivotally mounted in said housing near the lower end thereof, said housing being of a width greater than the width of said arm, a head light secured to the upper end of said arm, brackets extending rearwardly from said housing, a cam mounted on said brackets, said housing having an opening in the rear wall thereof to permit said cam to engage the arm within the housing, and means for actuating said cam.

7. In a device of the character described, an elongated housing having its upper end open and inclined upwardly and rearwardly, an arm pivotally mounted in said housing near the lower end thereof and projecting beyond the upper end of said housing, a head light carried by said arm, and means for moving said arm about its axis, the upper edge of the forward wall of said housing constituting a stop to limit the movement of said arm.

8. In a device of the character described, a supporting member adapted to be attached to a vehicle, an arm pivotally mounted on said supporting member, a head light secured to said arm at a point remote from its axis, a spring to retain said arm in its normal position, an actuating device to move said arm against the tension of said spring, a dash pot carried by said supporting member and comprising a plunger connected with said arm.

9. In a device of the character described, an elongated housing open at its upper end, an arm pivotally mounted in said housing near the lower end thereof, a head light carried by the upper end of said arm, a spring to retain said arm in its normal position, a cam to move said arm about its axis against the tension of said spring, means to actuate said cam, a cylinder secured to the upper end of said housing in the rear of said arm, and a plunger mounted in said cylinder and connected with said arm.

In testimony whereof, I affix my signature hereto.

OLIVER M. POLLOCK.